United States Patent [19]
Engen

[11] Patent Number: 5,587,448
[45] Date of Patent: Dec. 24, 1996

[54] REACTION SYSTEM FOR PRODUCING A POLYURETHANE AND METHOD OF USING SAME TO SEAL A SURFACE

[75] Inventor: Paul T. Engen, Martell Township, Pierce County, Wis.

[73] Assignee: Minnesota Mining and Manufacturing, St. Paul, Minn.

[21] Appl. No.: 366,308

[22] Filed: Dec. 29, 1994

[51] Int. Cl.$^6$ ............................ C08G 18/08; C08G 18/22
[52] U.S. Cl. ................... 528/55; 528/48; 528/49; 528/85; 528/374; 528/503; 521/121; 521/124; 427/290; 427/379; 427/385.5; 427/389.7; 427/407.2; 427/409; 502/152; 502/155; 502/156; 502/168; 502/216; 502/246; 502/249; 502/353
[58] Field of Search ....................... 528/55, 48, 49, 528/85, 374, 503; 521/121, 124; 427/290, 379, 385.5, 389.7, 407.2, 409; 502/152, 155, 156, 168, 216, 246, 249, 353

[56] References Cited

U.S. PATENT DOCUMENTS

| | | | |
|---|---|---|---|
| 3,074,544 | 1/1963 | Bollmeier et al. | 206/47 |
| 4,788,083 | 11/1988 | Dammann et al. | 427/340 |
| 5,011,902 | 4/1996 | Foucht | 528/55 |
| 5,250,651 | 10/1993 | Price | 528/59 |

FOREIGN PATENT DOCUMENTS

| | | |
|---|---|---|
| 0454219 | 10/1991 | European Pat. Off. . |
| 1-213382 | 8/1989 | Japan . |

OTHER PUBLICATIONS

Ephraim et al., "Kinetic Studies of the Reaction of Phenyl Isocyanate . . . in various Solvents", Abstract of Thesis of S. Ephraim, vol. 80, Oct. 16, 1957, pp. 1326–1328.

Britain et al., "Catalysis of the Isocyanate–Hydroxyl Reaction", J. Appl. Polymer Sci., vol. IV, Issue No. 11, (1960), pp. 207–211.

Leckert et al., "New Catalyst for Two Component Elastomer Systems", Polyurethanes World Congress, 1987–Sep. 29–Oct. 2, 1987, pp. 351–355.

J. Arenivar and Kurt C. Frisch et al., "Metal Carboxylates for Urethanes", Paper presented at UTECH '92, pp. 1–10.

Robins, J., "Metal Ion Catalysis in Mercaptan Isocyanate Reactions", Advances in Urethane Science Technology, vol. 12, Technonmic Publ. Co., Lancaster PA, (1993) pp. 25–58.

Primary Examiner—James J. Seidleck
Assistant Examiner—Duc Truong
Attorney, Agent, or Firm—Gary L. Griswold; Walter N. Kirn; Douglas B. Little

[57] ABSTRACT

This invention concerns a reaction system for producing a polyurethane having an isocyanate index value of at least 100, and a catalyzed reaction mixture thereof, having a gel time between 5 and 60 minutes. The reaction system, in one aspect, involves a mixture of first and second parts that are located in separate containers, respectively, which are effective to prevent contact between said first and second parts thereof until coating or sealing application is desired. This two-part reaction system includes:(a) a first part comprising a polyisocyanate component; b) a second part comprising: (i) a polyol component; (ii) a polyurethane catalyst comprising a bismuth/zinc polyurethane catalyst; and (iii) a molar excess of a complexing agent for the polyurethane catalyst, where the complexing agent is a mercaptan compound. This invention also concerns a method of forming a polyurethane sealant on a surface using the two-part reaction system and catalyzed reaction mixture.

28 Claims, 3 Drawing Sheets

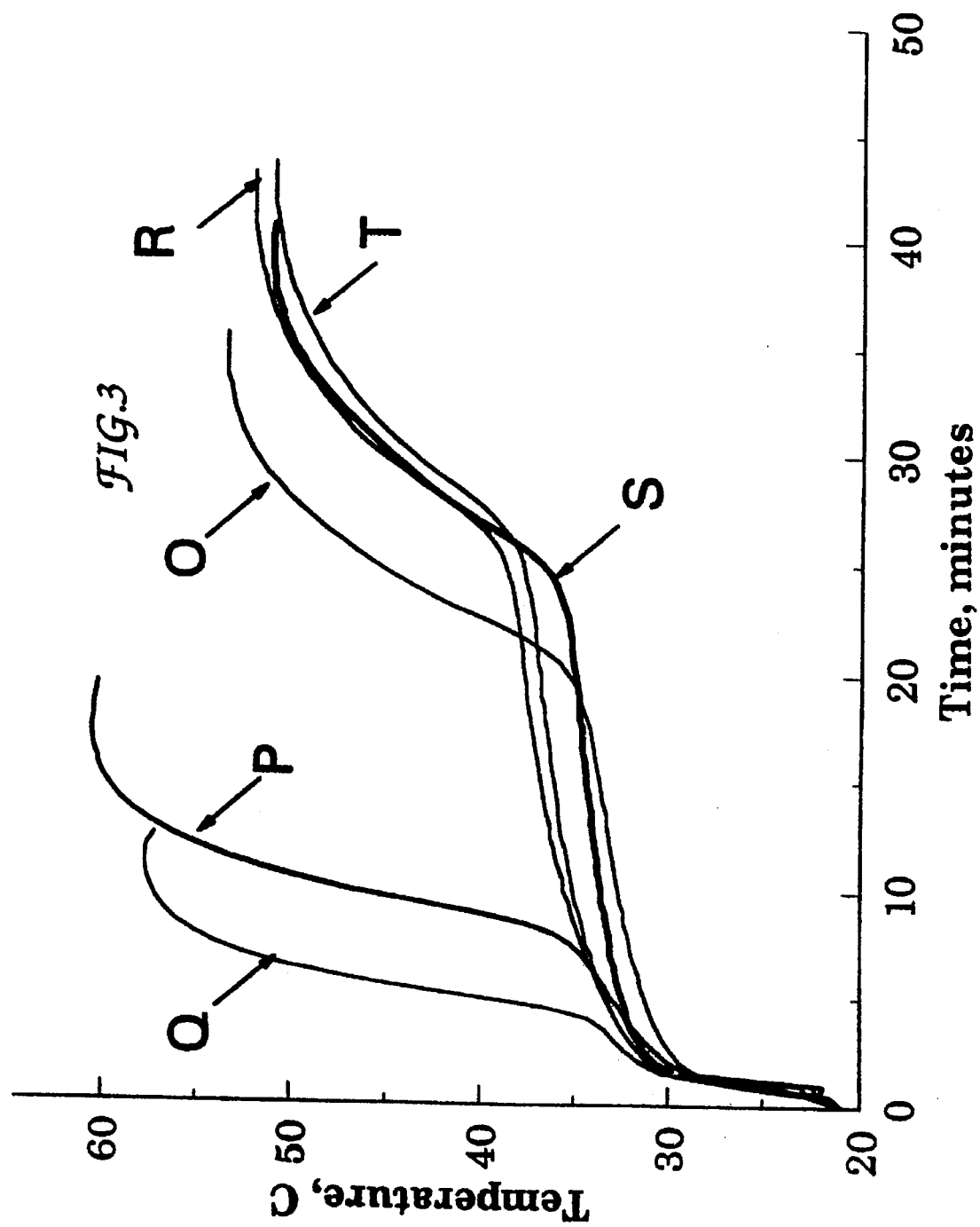

REACTION SYSTEM FOR PRODUCING A POLYURETHANE AND METHOD OF USING SAME TO SEAL A SURFACE

BACKGROUND OF THE INVENTION

1. Field of the Invention

This invention relates to a novel reaction system for producing a polyurethane including a unique catalyst system effective therefor. Such a reaction system finds use for example to form a sealant coating or strip.

2. Discussion of the Related Art

It is known to formulate polyurea-urethane compositions (e.g., sealants, coatings, foams, and the like) as two pack systems. One pack includes the isocyanate-reactive components such as polyols, together, typically with a catalyst and other customary additives, while the second pack includes the polyisocyanate. The catalyst is separately packaged from the polyisocyanate in order to prevent premature gelation of the latter component. The two packs are normally mixed immediately prior to application of the coating. Upon mixing the two packs, the hydroxyl groups of the polyol chemically react with the isocyanate groups of the polyisocyanate, ultimately leading to gelation. At gelation, the reaction mixture rapidly loses its fluidity with an attendant pronounced increase in viscosity. The time associated with reaching the gelation point also is often referred to as the "potlife".

While bismuth carboxylate catalysts are known, their catalytic effect in promoting the cure of isocyanate-containing compositions is such that the rate of cure is generally linear. While such rates of cure are desirable for some applications, a curing rate is also desirable for many applications characterized by providing a slow incipient build-up of viscosity but with the reaction mixture nonetheless completely curing or curing to a tack-free state within a relatively short period of time.

An example of such an application is for the cure of a two-pack or part urethane adhesive composition, wherein a "pot-life" is desired during which the composition may be handled and/or applied to a substrate before it substantially cures. In this regard, certain mercury compounds are known to be useful as latent catalysts, but their use is not desirable for environmental reasons.

One solution is taught by U.S. Pat. No. 4,788,083 which describes an activatable/complexed catalyst system which provides an extended potlife yet is readily activatable with vaporous amine or heat. The catalyst is a complexed catalyst generally comprising the reaction product of a tin and/or bismuth polyurethane catalyst with a molar excess of a complexing agent selected from a mercapto or polyphenol compound. However, the use of vaporous amine and/or heat activation methods to incite rapid cure may present problems on a commercial scale. For example, accurate dosage of the amine activator can be troublesome, which can adversely impact the appearance and resistance to yellowing. Use of heat activation requires an oven, which is impractical for operations involving large objects, such as installing and sealing a glass windshield into a car.

Laid-Open Japanese patent application JP H1-213,382 (Sakada et al.), Oct. 15, 1987, describes two component polyurethane adhesives wherein organic tin compounds are used in conjunction with multi-functional mercaptan compounds to delay the onset of cure and to provide "adaptability" (a period of workability) without undue lengthening of the adhesive hardening time.

European Patent Application Publication No. 0 454 219 (Oct. 30, 1991), describes a polyurethane system which is stated to eliminate the need for the amine or heat activation required in U.S. Pat. No. 4,788,083, by use of a polyol component having an acid value of about 5 or less. The publication describes polyurethane systems having extended potlifes of multiple hours.

Also, commonly assigned U.S. Pat. No. 5,250,651 discloses a sealant composition useful for insulation displacement connector enclosures. The sealant composition in U.S. Pat. No. 5,250,651 is synthesized by a reaction between polyether species and isocyanate species, requiring a stoichiometric deficit of the isocyanate reactant, that results in a gel-like polymer which is lightly cross-linked through urethane linkages.

Metal ion catalysis and inhibition of isocyanate reaction in the presence of mercaptans has been studied by J. Robins in *Metal Ion Catalysis In Mercaptan Isocyanate Reactions*, Advances in Urethane Science and Technology, Volume 12, Technonmic Publishing Company, Lancaster, Pa. 17604, (1993), pp. 25–58. J. Robins classifies metal ions in three categories on the basis of their ability to complex with mercapto cure inhibitors and yet act as catalysts after controlled induction period where no catalytic action is observed. Robins' three classes are: (1) metal ions which are good catalysts (e.g., $In^{+3}$, $Tl^{+4}$, $Sn^{+2}$); (2) metal ions which exhibit fair catalytic activity (e.g., $Zn^{+2}$, $Pb^{+2}$, $Bi^{+3}$, $Et_2Bi^+$); (3) metal ions which show a very low catalytic activity (e.g., $Ca^{+2}$, $Co^{+2}$, $Cu^{+2}$); and (4) no catalytic activity (e.g., $Li^+$, $Na^+$, $Al^{+3}$).

In a paper presented at UTECH '92 co-authored by John D. Arenivar (Shepard Chemical Co.) and Kurt C. Frisch et al. (Polymer Technologies, Inc., University of Detroit Mercy), entitled "Metal Carboxylates For Urethanes", a study is discussed of the kinetics of bismuth and/or zinc carboxylate-catalyzed urethane reactions by using model compounds for the reactants in separate non-competitive reactions. The data of this study is then described as having been used to successfully formulate flexible foams, catalyzed by bismuth and zinc carboxylate compounds in the absence of tertiary amine catalysts.

There also are many applications where a polyurethane sealant would be desirable which possesses a cure profile providing a sufficient induction period to tool and manipulate the contour the admixed sealant, if necessary, before the onset of cure. There also exists a need for a sealant that has a induction period that does not require special activation procedures, yet, in a relatively short period of time the coated workpiece can be quickly further handled or returned to service. An example of such an application is the installing of a glass windshield into a car frame.

That is, in many applications, such as installing a glass windshield into a car frame, rapid cures are desired without the need for special activators for the system. For instance, in a glass repair shop or vehicle assembly line setting for installing glass windshields, a glass sealant is desired which controllably cures or gels at a time that falls inside a time span or window beginning several minutes after admixture of the polyurethane-forming components to within about an hour after admixture. Such as cure profile would provide reasonably ample time to apply and perform any necessary tooling and shaping of the sealing coating on the surface to be sealed before the reaction mixture sets-up to an extent precluding such manipulation, while avoiding unduly long open times to allow the vehicle to be returned to service or further handled as soon as possible. The period of time spanning from the mixture of the polyurethane-forming components to the gel time is often referred to as the open time or induction time.

SUMMARY OF THE INVENTION

The present invention relates to a reaction system for producing a polyurethane, the catalyzed reaction mixture thereof involving a unique catalyst system therefor, and the cured polyurethane product derived therefrom. The novel reaction system for producing polyurethane meets specific temporal-related criteria of controlled onset of cure, but with rapid curing achieved shortly thereafter without the need for special activation procedures.

In one embodiment, there is a two-part reaction system for producing a polyurethane having an isocyanate index of at least 100 or greater in value from a catalyzed reaction mixture, and the polyurethane having a gel time between 5 and 60 minutes after admixture of said two parts, where the first and second parts, as two packs, are located in separate containers, respectively, which are effective to prevent contact between said first and second parts thereof until coating application is desired. This two-part reaction system includes:

(a) a first part comprising a polyisocyanate component;

(b) a second part comprising:
  (i) a polyol component;
  (ii) a polyurethane catalyst comprising a bismuth/zinc polyurethane catalyst; and
  (iii) a molar excess of a complexing agent for the polyurethane catalyst, where the complexing agent is a mercaptan compound.

In a further embodiment, the mercaptan compound is selected from the group consisting of a mercaptoalkylalkoxy silane, a thioglycol, and an alkylthiol, and mixtures thereof.

The bismuth/zinc polyurethane catalyst comprises a physical mixture of a bismuth salt and a zinc salt. Preferably, the bismuth salt and zinc salt are organometallic catalytic compounds of bismuth and zinc, respectively.

The reaction system of this invention preferably employs the polyisocyanate component and the polyol component in amounts providing an isocyanate index of from 105 to 150.

In the preferred reaction systems of the present invention, in the period of time of 5 to 60 minutes after admixture of the reactants, the catalyzed systems show at least a fivefold increase in viscosity, in centapoise, within a time span (window) of less than 10 minutes, where the viscosity is measured using a Brookfield rheometer with a T-F spindle at 2 rpm in conjunction with a helipath at a temperature of 25° C. and at approximately 50% relative humidity. These systems offer a highly useful controlled onset of cure together with a relatively rapid cure well-suited for applications such as windshield sealing. These systems also have wetting and tack properties compatible to the coating of a wide variety of different types of materials.

In yet another embodiment of the present invention, there is a method of forming a polyurethane sealant on a surface using the aforesaid two-part reaction system and the catalyzed reaction mixture thereof. The polyurethane systems of the present invention are especially useful in sealing glass surfaces, such as glass windshields.

As used herein, these terms have the following meanings:

"Polyurethane" means a synthetic polymer formed by reacting hydroxyl and isocyanate groups to give the urethane linkage group —NHC(O)O—;

"Gelation" means the point of cure where the mixture of sealant components achieves at least a five-fold increase in viscosity (in centapoise) in open air as compared to the initial viscosity of the mixture;

"Gel-time" or "Pot-life" have the same meaning for purposes of this invention, and mean the duration of time required for the sealant to achieve gelation as determined from the time of admixture of the sealant components, i.e., the polyurethane-forming components;

"Isocyanate index" and "NCO-index" refer to the ratio of NCO groups over reactive hydrogen atoms present in a polyurethane formulation given as a percentage:

$$\text{NCO-index} = \frac{\text{(NCO)}}{\text{(active hydrogen)}} \times 100;$$

"Active hydrogens" refers to the total of hydroxyl hydrogen atoms present in the reactive compositions, such as determinable by the Zerewitnoff test;

"Polyol" means a substance containing a stoichiometric average of at least 1.5 hydroxyl group attached per molecule;

"Polyurethane catalyst" means a substance capable of promoting the hydroxyl/isocyanate reaction forming the polyurethane;

"Bi/Zn Polyurethane catalyst" means a polyurethane catalyst comprised of a physical mixture of a catalytically-active bismuth compound and a zinc compound;

"Complexing agent" means a substance which forms a complex with the polyurethane catalyst which, at least temporarily, blocks or otherwise renders unreactive the catalyst;

"Mercaptan compound" means an organic compound having at least one —SH (mercapto) group;

"Molar excess", as used in connection with the complexing agent, means that the number of moles of mercaptan compound present exceeds the number of moles of catalyst present;

"Polyisocyanate" means a compound containing at least two —N=C=O groups;

"Toolable" means the capability of an applied bead of adhesive or sealant to be shaped out of its original form with pressure force exerted by a trowel or like device without substantial removal, transfer or loss of adhesive material from the bead;

"Reactive", as used to characterize the polyurethane-forming component system, means a material containing at least two different co-reative monomers, oligomers or prepolymers capable of being polymerized after application to a substrate to form a three-dimensional polymeric network;

"Curable" has the same meaning as "reactive";

"Wetting" means the process in which a liquid spontaneously adheres to and spreads on a solid surface:

"Open time" or "induction time" means the time after the polyurethane-forming components are intimately mixed together to the gel time.

Other embodiments, features and advantages of the present invention will become apparent from the following drawings and description of the preferred embodiments.

BRIEF DESCRIPTION OF THE DRAWINGS

FIG. 3 shows cure profiles for polyol/polyisocyanate systems in different types and levels of solvent.

DETAILED DESCRIPTION OF THE PREFERRED EMBODIMENTS

Figure 1:
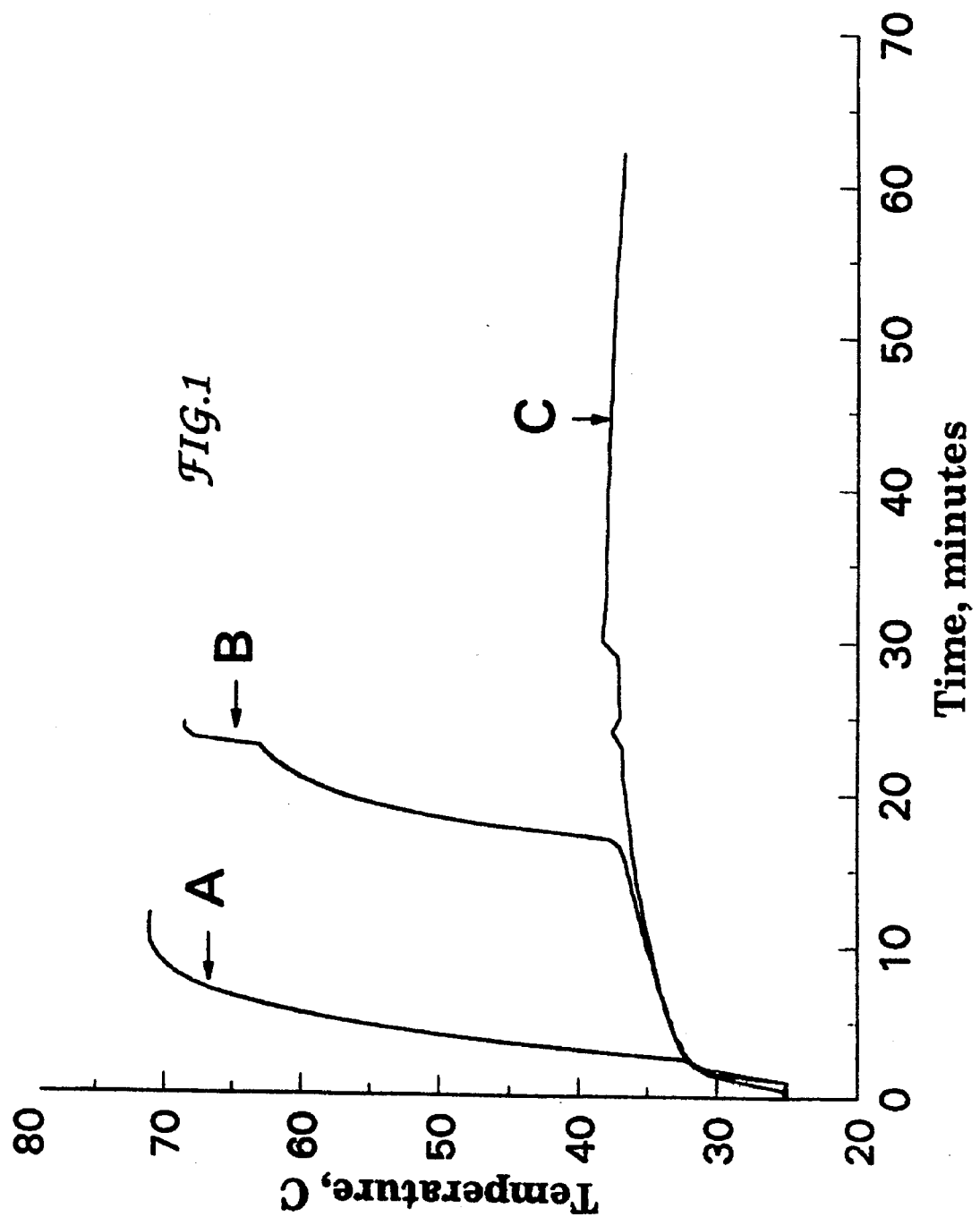
FIG. 1 shows cure profiles for polyol/isocyanate systems using different catalytic systems involving Bi, Bi/Zn and Zn polyurethane catalysts each in combination with a mercaptan complexing agent.

The present invention, in its broadest concept, provides a catalyzed reaction mixture for producing a polyurethane, which catalyzed reaction mixture comprises a particular polyol component, a polyisocyanate component, and a particular complexed polyurethane catalyst.

Preferably, sealants of this type are stored prior to use in such a fashion that the catalyst and the isocyanate are not in contact with one another or are introduced to the enclosure immediately upon formulation. Various approaches are known for such separation, e.g., using a two-part caulking-like gun which has the isocyanate component in one reservoir, and the polyol component, catalyst and mercaptan compound in a second reservoir. For example, a two part plunger can be installed in the barrel portion of the caulk-like gun so that simultaneous ejection and mixture of the polyol and isocyanate compositions can be accomplished.

In a separate arrangement for storing and delivering the polyurethane-forming components of the invention, the polyol (and catalyst and mercaptan compound) and polyisocyanate components can be conveniently packaged in separate dual compartments of a moisture-proof hermetically-sealed flexible plastic package. The separate compartments of the package are sealed, such as by heat sealing, after filling with the polyurethane-forming components, in a manner excluding all air from the compartment such that the volume of each compartment, as sealed, is the same as that of the polyurethane-forming materials filled therein. The dual compartments can be side-by-side and separated by a sealed membrane or wall of the flexible plastic located therebetween. For purposes of temporarily storing the polyurethane-forming materials up until the mixing step, a part of the reaction system is placed in one open side compartment of the two-part bag. By way of explanation, in one embodiment, the two-part bag can be formed of a three-ply laminate sheet material of polyester and polyethylene materials obtained under the tradename Scotchpak™ X29905 film commercially available from 3M, St. Paul, Minn. This bag can be preformed of two superposed sheets of the Scotchpak™ film, the film being a three-ply laminate comprising a 0.5 mil (12.7 μm) medium density polyethylene film as an outer layer; a 0.5 mil (12.7 μm) polyester film as a middle layer; and a 3.5 mil (89 μm) low density polyethylene film as the innermost layer. The two sheets are heat sealed along a medial strip including a nonwoven strip material disposed in-between the two sheets at the site to be heat-sealed to form a ruptureable seal in-between the two compartments ultimately formed. A technique for forming a suitable two-part bag for this invention with a ruptureable seal therein is described in U.S. Pat. No. 3,074,544 to Bollmeier, which is incorporated herein by reference. In this regard, the bag also is continuously heat sealed along its perimeter to seal the lateral side edges to form a compartment or pocket on each side of the medial ruptureable seal, except leaving one side of the formed compartment on each side of the ruptureable seal temporarily open until filled with a part of the reactant system. In order to bond the two superposed layers together to form the various seals, heat sealing methods and equipment used for sealing plastic bag materials that are common in the art can be suitably used. In any event, after filling a compartment with one part of the reaction system of the invention, the filled compartment is heat sealed at the last unsealed side edge of the sheets for that compartment, such as by an automatically controlled air operated heating bar sealer obtained from Pack-Rite Machines, Franksville, Wisc., to exclude all air from the filled pocket, thus forming a sealed pocket volume equal to that of the amount of formulation added thereto. Then, the second part of the reaction system of the invention is placed in the other side compartment of the bag located on the opposite side of the ruptureable seal, where the second compartment is formed in the same manner as first compartment, and then heat sealed to enclose the second part.

To provide even greater resistance against water vapor and moisture, or light, infiltration through the thickness of the bag, it is preferred to employ bleached kraft paper or aluminum foils as interior layers of the laminate film forming the walls of the bag. For example, the flexible package can be provided as a plastic/thin metal foil/plastic laminate with the metal foil representing the middle layer to prevent the contents of the package from being exposed to water and/or light before usage. In this embodiment, bag again is preformed of two superposed sheets of film, the film in this case being a three-ply laminate comprised of a 1 mil (25.4 μm) polyester film as an outer layer; a 0.35 mil (8.9 μm) aluminum foil film (1145 type) as a middle layer; and a 3.0 mil (76.2 μm) low density polyethylene film as the innermost layer. In another embodiment of the bag, bag again is preformed of two superposed sheets of film, the film in this case being a four-ply laminate comprised of a 25 lb. MG bleached kraft paper as an outermost layer; a 1 mil (25.4 μm) polyester film immediately adjacent and beneath the kraft paper outermost layer; a 0.5 mil (12.7 μm) aluminum foil film (1145 type) as the next layer; and a 0.3 mil (7.6 μm) low density polyethylene film as the innermost layer of the film used to construct the bag.

When applying the sealer to a substrate, the general procedure is that contents of the bag compartments can be released from the compartments by rupturing the middle seal to allow the contents of each side of the bag to intermingle; the bag is cut open at one end and the bag inserted into a chamber of a delivery device with the opened end oriented towards the outlet of the delivery device, such as a caulking gun; and the mixture discharged as a mixed coating stream onto a substrate. A retractible plunger mechanism can be used to force the mixed coating out of a nozzle part of the device located at the opposite end of the delivery device. Known types of barrel and plunger sealant and caulk delivery devices in the field generally can be used in this regard.

Polyol Component

The polyol component may comprise one polyol or a combination of different polyols. As suitable polyols may be mentioned any of those utilizable for the production of polyurethanes. Such polyols are, in general, well known to those skilled in the art.

Polyols useful in the invention typically are liquid or quasi-liquid polyols, with average functionality of from 1.5 or more, preferably a functionality of from 2 to 8, di-or trifunctional polyols being most preferred. Suitable polyols have a weight average molecular weight of about 400 to about 50,000, preferably from about 800 to 20,000.

Suitable polyols include a wide variety of polyether, polyester, polyacrylic, polyvinyl, poly(epoxyester), polycarbonate, polyurethane and polyurea based polyols. These and other suitable polyols are well-known to those skilled in the art.

More specifically, suitable polyols may be selected from polyether polyols based on ethylene oxide, propylene oxide, butylene oxide, tetrahydrofuran, epichlorohydrin or mixtures thereof, ricinoleic acid derivatives, e.g., castor oil; polyester polyols, polyamide or polyesteramide polyols; tertiary amine containing polyols, e.g., ethoxylated or propoxylated amides or amines; polyalkadiene polyols derived from butadiene polymers or copolymers, and hydrogenated derivatives thereof; polyacetals, polycarbonates containing hydroxyl groups; polyhydroxyl (meth)acrylic resins, polythioether polyols, polymer polyols, and the like.

Also, suitable polyols are exemplified by EP 0454219, incorporated herein by reference, including certain polyester polyols and polyacrylic polyols. These suitable polyester polyols can be obtained, for instance, by the polycondensation of one or more di- and/or higher functional carboxylic acids with one or more di- and/or higher functional hydroxy compounds, optionally in combination with one or more monofunctional carboxylic acids and/or hydroxy compounds. The suitable acrylic polyols can be obtained, for instance, by the (co)polymerization of hydroxy-functional acrylic monomers with other ethylenically unsaturated comonomers in the presence of a free radical initiator.

The particular choice of polyol component, of course, depends upon a number factors including, primarily, the other components of the reaction mixture and the desired end use. These and other factors are well-known to those skilled in the art, who can make the proper selection of the polyol component accordingly.

Polyisocyanate Component

The polyisocyanate component may comprise one polyisocyanate or a combination of different polyisocyanates. As with the polyol component, as suitable polyisocyanates may be mentioned any of those utilizable for the production of polyurethanes. Such polyisocyanates are, in general, well known to those skilled in the art, and, for example, they are exemplified in U.S. Pat. No. 4,788,083 at column 8, line 63 through column 9, line 30, incorporated herein by reference.

The term isocyanate also includes isocyanate-terminated prepolymers. Polyisocyanates may be linear or branched, aliphatic, cycloaliphatic, arylalkyl, heterocyclic or aromatic, or any combination of such polyisocyanates. When the isocyanate component contains only one compound, it preferably is an aliphatic isocyanate. Particularly suitable polyisocyanates correspond to the formula $Q(NCO)_n$ in which n is an integer of from about 2 to about 4, and Q is selected from an aliphatic hydrocarbon radical containing from about 2 to about 100 carbon atoms, and zero to 50 heteroatoms; a cycloaliphatic hydrocarbon radical containing from 4 to 100 carbon atoms and zero to 50 heteroatoms; an aromatic hydrocarbon radical or heterocyclic aromatic radical containing from 6 to 15 carbon atoms and zero to 10 heteroatoms, and an arylalkyl hydrocarbon radical containing from 8 to 100 carbon atoms and zero to 50 heteroatoms. The heteroatoms that can be present in Q include non-peroxidic oxygen, sulfur, non-amino nitrogen, halogen, silicon, and non-phosphino phosphorus.

Polyisocyanates preferably will have from about 2–4 isocyanate groups per molecule for use in the sealing/adhesive/coating composition of the present invention. Suitable polyisocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl) cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of isocyanate equivalents of the polyisocyanate cross-linking agents to the hydroxyl groups from the hydroxy resinous materials preferably should be greater than about 1:1 and can range from about 1.05:1 up to about 1.5:1. At least a slight excess of isocyanate is required in this invention to react with surface water (including water vapor) or water present in the polyol side of the system. The precise intended application of the sealing or coating composition often will dictate this ratio or isocyanate index. Therefore, the isocyanate index should be at least 100 or higher in value, preferably at least 105 to better ensure maintainance of adequate tensile and elongation properties. However, if the isocyanate index approaches about 150 or higher, the composition may be too rigid when cured to conform to the contours required.

Complexed Polyurethane Catalyst

The isocyanate groups of the polyisocyanate component react with the hydroxyl groups of the polyol component under the influence of the polyurethane catalyst to form urethane linkages. Suitable polyurethane catalysts for use with the present invention are complexed catalysts comprising a certain polyurethane metal catalyst complexed with a mercaptan compound.

Polyurethane Metal Catalyst

In general, these complexed polyurethane catalysts may be described as zinc and bismuth polyurethane catalysts which have been complexed (blocked) by reaction with a molar excess of a complexing agent selected from mercaptan compounds.

A wide variety of zinc and bismuth polyurethane catalysts are suitable for the combination, such bismuth neodecanoate and zinc neodecanoate. Such a catalyst is available as BICAT™8 from Shephard Chemical, which comprises a physical mixture of bismuth neodecanoate and zinc neodecanoate made with approximately equal amounts by weight based on the weight amounts of the Bi and Zn.

Suitable zinc and bismuth catalysts include salts of zinc and bismuth individually as any of organometallic chelates, alcoholates, phenolates, and salts of organic acids, tertiary amines, organic tin compounds, bicyclic amidines, aminosilanes, acidic metal salts of strong acids, tertiary phosphines, alkali and alkali earth metal hydroxides, and the like, and combinations thereof.

The amount of polyurethane catalyst (uncomplexed) generally ranges from about 0.01 to about 0.5 wt %, based upon the combined weight (solids) of polyol component and polyisocyanate component. This amount, of course, can vary widely depending, for example, on the particular components, desired end use, curing conditions and other factors well-known and appreciable to those skilled in the art.

Complexing Agent

The complexing agent is used in conjunction with the bismuth and zinc catalyst. The complexing agent, for purposes of this invention, is a mercaptan compound. It is not precisely known what dynamics occur to make the bismuth/zinc/mercaptan catalytic mixture produce a latent catalyst for catalyzing the chemical reaction between an isocyanate compound and a isocyanate-reactive compound, polyols, to form a product containing at least one urethane linkage. Without desiring to be bound by any particular theory at this time, it nonetheless is thought that the mercaptan compound displaces some or all of the ligands on the bismuth/zinc catalysts which inhibits the metal catalysts' ability to catalyze the hydroxyl/isocyanate reaction. The isocyanate functionality is reactive with the catalyst system used in this invention.

The mercaptan ligand reacts with the free isocyanate groups, forming thiocarbamic linkages. It is believed that once the mercapto groups have been consumed, the hydroxyl/isocyanate reaction then becomes the predominate reaction. These theorized dynamics would account for the induction period or delay in the cure of the polyurethane.

It has been observed by present inventor that a wide variety of mercaptans are useful to give an induction time. However, it is not precisely understood at this time why certain mercaptans are more efficient at giving a delay than others. By this, if each mercaptan is added to the polyurethane reaction mixture at a same level based on equivalents, it has been observed by the present investigator that the induction period varies from one compound to another. Under one possible theory, if it is assumed that the mercaptan is binding to the metal atoms in the catalyst to produce the induction period, then it appears that bond energy is the key to induction. This behavior could be explained by steric effects. Consistent with this theory, it has been observed by the inventor that mercaptopropyltrimethoxy silane gives an induction period which can vary from 5 to 20 minutes from sample to sample between polyurethane-forming systems of the same formulation. This difference, it is theorized, may be attributable by the ability of this compound to cyclize. The native noncyclic form of the compound gives the delay, while the cyclic form would not have the mercapto group available to complex/bond to the metal atom of the catalyst.

A preferred mercaptan are those that are polyfunctional. By this, it is meant that the mercaptan compound has another group(s) in addition to the mercapto group(s) present which also can react with isocyanate. Examples of polyfunctional mercaptans useful in the present invention include mercaptoethanol, $HSCH_2CH_2OH$, thioglycerol, and $HSCH_2CH(OH)CH_2OH$.

On the other hand, the present inventor has also observed that polyfunctional mercaptan compounds had a tendency to precipitate from the reaction mixture and this may explain their diminished catalytic activity.

In a another embodiment, the mercaptan compound is selected from the group consisting of a mercaptoalkylalkoxy silane, a thioglycol, and an alkylthiol. Mercaptoalkoxy silanes provide adhesion promotion, especially to glass surfaces, which is contributed by these materials in addition to their complexing effect on the catalyst. On the other hand, as indicated above, the mercaptoalkoxy silanes, although effective for meeting the requirement of the invention relating to providing a gel time between 5 and 60 minutes, have been observed in some cases to impart a less consistent and predictable extent of delay between 5 and 60 minutes from sample to sample, all other things kept equal. In any event, the mercapto-alkylalkoxy silane can be selected from a gamma-mercaptopropyl-trimethoxysilane, a gamma-mercaptopropyltriethoxysilane, a gamma-mercaptopropylmethyldimethoxy silane, a mercaptoethyltrimethoxysilane, and a beta-mercaptoethyltriethoxysilane.

The complexed polyurethane catalysts of this invention are produced by reacting the polyurethane catalyst with a molar excess of the complexing agent. As long as this requirement is met, the complexing agent/catalyst ratio may otherwise vary widely. It is preferred, however, that the molar ratio of complexing agent to metal group of the catalyst ranges from about 2:1 to about 1000:1, more preferably from about 10:1 to about 100:1, and especially from about 10:1 to about 50:1.

Although the reactions to prepare the polyurethane-forming compositions of the present invention are preferably conducted at or near ambient temperature, it should be obvious to one skilled in the art that the reaction rate may be accelerated, if desired, by the application of elevated temperatures; although no heat activation is required for the polyurethane-forming compositions of the present invention.

It is also possible to add other adjuvants to the above-described polyurethane-forming reactants so long as the addition thereof does not result in a loss of the required gel time and curing speeds. For example, the polyurethane-forming compositions of this invention additionally can optionally contain opacifying pigments and inert extenders such as, for example, titanium dioxide, zinc oxide, clays such as kaolinite clays, silica, talc, carbon or graphite (e.g. for conductive coatings), and the like. Additionally, the coating compositions can contain tinctorial pigments, corrosion-inhibiting pigments, and a variety of agents typically found in coating compositions. Such additional additives include, for example, surfactants, flow or leveling agents, pigment dispersants, and the like.

Fillers or combinations of fillers may also be present, such as glass or polymeric microspheres, glass fibers, graphite fibers, fibrous materials emanating from an organic polymer, carbon black, mica, aluminum oxide hydrates, various silicates or carbonates or clays, fumed silica and the like. The term "filler" is used herein to include all solid additives including particulate matter or fibrous matter, present in the composition. Illustrative of the above materials is a fumed silica available under the trade name Cab-O-Sil™ from Cabot, and "Wollastonite", a clay filler available from Nyco Chemicals, Inc.

Also, certain reactive adjuvants can be added to either side (part) of the two-part polyurethane-forming system of the invention, or concurrently with the mixture of the two parts of the system, as long as the addition thereof does not result in a loss of the required gel time and curing speeds. For example, chain extenders can be added and used to increase and tailor the polyurethane chain size. Useful chain extenders for the present invention include diols and diamines such as 4,4'-methylene bis(2-chloroaniline)("MOCA"), butane diol, hexane diol, propylene glycol, bisphenol A, or polyalkylene oxide polyols with weight average molecular weights between 100 and 500. The chain extenders can also be triols such as glycerine, trimethylol propane, or propoxylated adducts of glycerine or trimethylol propane or amines like diethyltoluene diamine, ethylene diamine, substituted aromatic diamines, triisopropyl amine, 4,4'-methylene-bis-(2, 6-diethylaniline), methylene bis (orthochloro-aniline), N,N-bis (2-hydroxypropyl)aniline, and combinations thereof. Preferred chain extenders include 1,4-butane diol and 4,4'-methylene-bis(2,6-diethylaniline), and combinations thereof.

The following nonlimiting examples will further illustrate the invention. All parts, percentages, ratios, and the like, in the examples are by weight unless indicated otherwise.

EXAMPLES

Test Methods: Cure Profile Determination

Cure profiles were determined using a Brookfield Programmable Rheometer (Model DV-III). The viscosities were determined in centapoise (cps) using the T-F spindle at 2 rpm in conjunction with the helipath at a temperature of 25° C. and a relative humidity of approximately 50%. Both the viscosity and the temperature were measured versus time.

The two parts of the polyurethane-forming reactants were released from the two compartments of a storage bag, described in more detail hereinafter, by rupturing an intervening temporary seal barrier formed between the two compartments, opening the bag by snipping an end, and squeezing the contents out of the bag into a mixing bowl, and then the contents were blended for 40 seconds in such a way that no air was whipped into the sample mixture. Immediately thereafter, between 90–110 g of the reaction mixture is placed into a Dixie® cup, which was a truncated conical shape with a diameter at the top (mouth) of approximately 5.5 cm, a height of approximately 6 cm, and a diameter at the bottom of approximately 3.8 cm. The T-F spindle and temperature probe were quickly inserted and the viscosity and temperature of the reation mixture were recorded as a function of time (inclusive of the above-mentioned 40 seconds of preblending). The viscosity was measured until the viscosity reached 10,000,000 cps. The temperature probe was removed after the exotherm has been reached.

Part A

Example 1

To a 12 liter reaction vessel fitted with a nitrogen purge were added 4918 g of a polyether triol with an average molecular weight of 6000 obtained under the trade name E2306 from ARCO Chemical Company, 2420 g of a polyether diol having an average molecular weight of 2000 obtained under the trade name PPG 2025 from ARCO Chemical Company, 200 g of a polyether diol having an average molecular weight of 1000 obtained under the tradename PPG 1025 from ARCO Chemical Company, 825 g of a partially hydrogenated terphenyl as plasticizer obtained under the trade name HB 40 from Monsanto Co., and then 3500 g of 4,4'-diphenyl methane diisocyanate obtained under the trade name Mondur M from Miles Inc. was added thereto, and the mixture was allowed to react at 80° C. with agitation. After the exothermic reaction ended, in which the temperature was not allowed to exceed 110° C., a prepolymer resulted with an isocyanate content of 8.1%.

Example 2

To a 12 liter reaction vessel fitted with a nitrogen purge were added 4735 g of a polyether diol with an average molecular weight of 4000 obtained under the trade name E2204 from ARCO Chemical Company, 1157 g of a polyether diol having an average molecular of 1000 obtained under the trade name PPG 1025 from ARCO Chemical Company, 1000 g of a plasticizer obtained under the tradename HB 40 from Monsanto Co., and then 3109 g of 4,4'-diphenyl methane diisocyanate obtained under the trade name Mondur M from Miles was added thereto, and the mixture was allowed to react at 80° C. with agitation. After the exothermic reaction ended, in which the temperature was not permitted to exceed 110° C., a prepolymer resulted with an isocyanate content of 8.47%.

Part B

Example 3

To a 4 liter reaction vessel fitted with nitrogen purge were added 673.3 g of a polyether triol with an average molecular weight of 6000 obtained under the trade name E2306 from ARCO Chemical Company, 673.3 g of a polyether diol having an average molecular weight of 2000 obtained under the trade name PPG 2025 from ARCO Chemical Company, 332 g of a polyether diol having an average molecular of 1000 obtained under the trade name PPG 1025 from ARCO Chemical Company, 117.0 g of 1,4-butanediol, 40.3 g of 4,4'-methylene-bis-(2,6-diethylaniline) obtained under the trade name Lonzacure M-DEA from Lonza Co., 32.0 g of (3-mercaptopropyl)trimethoxysilane obtained under the trade name A-189 from OSi Specialties Inc., and 2.1 g of a 50:50 mixture, by weight, of bismuth and zinc neodecanoates obtained under the trade name Bicat™ 8 from Shepherd Chemical Company, were mixed for 1 hr at 50° C. with agitation.

Examples 4–6

In formulating the polyurethane-forming reactant for each of Examples 4–6, the following general procedure was followed. To a 4 liter reaction vessel fitted with nitrogen purge were added about 670 g of a polyether triol with an average molecular weight of 6000 obtained under the trade name E2306 from ARCO Chemical Company, about 670 g of a polyether diol having an average molecular weight of 2000 obtained under the trade name PPG 2025 from ARCO Chemical Company, about 331 g of a polyether diol having an average molecular of 1000 obtained under the tradename PPG 1025 from ARCO Chemical Company, about 117 g of 1,4-butanediol, about 40.3 g of 4,4'-methylene- (2,6-diethylaniline) obtained under the trade name Lonzacure M-DEA from Lonza Co., about 32 g of (3-mercaptopropyl)trimethoxysilane obtained under the trade name A-189 from OSi Specialties Inc., and 1.2 g of the catalyst indicated in Table 1 were mixed for 1 hr at 50° C. with agitation. Table 1 summarizes the reagants and amounts (in grams) used in formulating each of Examples 4–6. Further, in Table 1, the meaning of other abbreviations used therein are as follows: "1,4-BDO" means 1,4-butanediol; "Bicat 8" means 50:50 mixture, by weight, of bismuth and zinc neodecanoates obtained from Shepherd Chemical Company; "Bicat Z" means zinc neodecanoate obtained from Shepherd Chemical Company; "Coscat 83" means bismuth neodecanoate obtained from CasChem Inc.

TABLE 1

| | Examples | | |
|---|---|---|---|
| Reagents | 4 | 5 | 6 |
| E2306 | 670.1 | 670.0 | 670.2 |
| PPG 2025 | 670.2 | 670.2 | 670.2 |
| PPG 1025 | 331.0 | 331.0 | 331.0 |
| 1,4-BDO | 117.0 | 117.1 | 117.0 |
| M-DEA | 40.3 | 40.2 | 40.3 |
| A-189 | 32.1 | 31.9 | 32.1 |
| Bicat Z | 1.2 | — | — |
| Bleat 8 | — | 1.2 | — |
| Coscat 83 | — | — | 1.1 |

Study One

Studies were undertaken to determine the effect of (3-mercaptopropyl)trimethoxysilane as the mercaptan complexing agent on various different polyurethane catalysts using the cure profile. In this study, Example 1 as Part A and Examples 4–6, respectively, as Part B, which had the formulations described above, were mixed together in amounts described herein providing an isocyanate index of 105.

For purposes of temporarily storing these formulations up until the mixing step, 100 g of the Example 1 formulation was placed in one open side compartment of a two-part bag. By way of explanation, the two-part bag was formed of a three-ply laminate sheet material of polyester and polyethylene materials obtained under the tradename Scotchpak™ X29905 film commercially available from 3M, St. Paul, Minn. This bag was preformed of two superposed sheets each of a three-ply laminate comprising a 0.5 mil (12.7 μm) medium density polyethylene film as an outer layer; a 0.5 mil (12.7 μm) polyester film as a middle layer; and a 3.5 mil (89 μm) low density polyethylene film as the innermost layer. The two sheets were heat sealed along a medial strip including a nonwoven strip material disposed in-between the two sheets and heat-sealed at the site to be heat-sealed to form a ruptureable seal in-between the two compartments ultimately formed. The technique for forming the two part bag of this study with a ruptureable seal is described in U.S. Pat. No. 3,074,544 to Bollmeier, which is incorporated herein by reference. The bag also was continuously heat sealed along its perimeter to seal the lateral side edges except leaving an end of each compartment temporarily open until filled with a part of the reactant system.

After filling a compartment with the 100 g of Example 1 formulation, the filled compartment was heat sealed at its end by an automatically controlled air operated heating bar sealer obtained from Pack-Rite Machines, Franksville, Wisc., to exclude all air from the filled pocket, thus forming a sealed pocket volume equal to that of the amount of formulation added thereto.

Then, 76 g of the Example 4, 5 or 6 formulation was placed in the other side compartment of the bag located on the opposite side of the ruptureable seal and heat sealed in the same manner as first compartment. As an extra precaution against moisture infiltration, the filled bag was stored in a dessicator jar until opened. The cure profile for the packaged polyurethane-forming reactants was later determined using the above mentioned Test Methods procedure. FIG. 1 graphically shows the results of this Study One.

In FIG. 1, curve "A" represents the system using Bicat 8 as the catalyst; curve "B" represents results for the system using Coscat 83 as the catalyst; and curve "C" represents the system using Bicat Z as the catalyst.

The gelation points for the polyurethane systems summarized in FIG. 1 are indicated as occurring at that portion of the curves, if any, characterized by a rapid rise in the mixture temperature as a function of the time parameter, viz. a rise of at least 25° C. in the mixture and occurring within a time span less than 10 minutes or less.

Examples 7–17

Additional samples of the part B side of the polyurethane-forming formulation was prepared according to the following general procedure. To a 4 liter reaction vessel fitted with nitrogen purge were added 349.2 g of a polyether diol with an average molecular weight of 6000 obtained under the trade name ARCOL 24-32 from ARCO Chemical Company, 349.2 g of a polyether triol having an average molecular weight of 2000 was obtained under the trade name ARCOL 34-28 from ARCO Chemical Company, 172.5 g of a polyether diol having an average molecular weight of 1000 obtained under the trade name Poly G 55-112 from Olin Chemical Company, 60.2 g of 1,4-butanediol, 21.1 g of 4,4'-methylene-bis-(2,6-diethylaniline) obtained under the trade name Lonzacure M-DEA from Lonza Co., 4.0 g of mercaptan in Examples 7–16 but not Example 17, and 1.6 g of catalyst, were mixed for 1 hr at 50° C. with agitation. The catalyst used was obtained under the tradename Bicat™ 8 from Shepherd Chemical Company, which catalyst was a physical mixture of bismuth neodecanoate and zinc neodecanoate made with approximately equal amounts by weight based on the weight amounts of the Bi and Zn, The specific formulations for Examples 7–17 are summarized in Table 2 indicating the reagants and amounts (in grams) used for each example. In this regard, and further to the defintions provided above, in Table 2, "1,4-BDO" means 1,4-butanediol; thioglycerol means 3-mercapto-1,2-propanediol, obtained from Aldrich Chemical; "2-MTI" means 2-mercaptotoluimidazole, obtained from Aldrich Chemical; "2,3-DM-1,3,4-T" means 2,3-dimercapto-1,3,4-thiadiazole, obtained from Aldrich Chemical; "PETMP" means pentaerythritol tetrakis(3-mercaptopropionate), obtained from Aldrich Chemical; "GDMP" means "glycol dimercaptopropionate", obtained from Aldrich Chemical; "2-MBI" means 2-mercaptobenzimidazole, obtained from Aldrich Chemical; "2-MBT" means 2-mercaptobenzothiazole, obtained from Aldrich Chemical.

TABLE 2

| | Examples | | | | | | | | | | |
|---|---|---|---|---|---|---|---|---|---|---|---|
| Reagents | 7 | 8 | 9 | 10 | 11 | 12 | 13 | 14 | 15 | 16 | 17 |
| Arcol 24–32 | 349.20 | 349.20 | 349.20 | 349.20 | 349.20 | 349.20 | 349.20 | 349.20 | 349.20 | 349.20 | 349.20 |
| Arcol 34–28 | 349.20 | 349.20 | 349.20 | 349.20 | 349.20 | 349.20 | 349.20 | 349.20 | 349.20 | 349.20 | 349.20 |
| Olin 55–112 | 172.50 | 172.50 | 172.50 | 172.50 | 172.50 | 172.50 | 172.50 | 172.50 | 172.50 | 172.50 | 172.50 |
| 1,4-BDO | 60.20 | 60.20 | 60.20 | 60.20 | 60.20 | 60.20 | 60.20 | 60.20 | 60.20 | 60.20 | 60.20 |
| M-DEA | 21.10 | 21.10 | 21.10 | 21.10 | 21.10 | 21.10 | 21.10 | 21.10 | 21.10 | 21.10 | 21.10 |
| Thioglycerol | 4.0 | — | — | — | — | — | — | — | — | — | — |
| Capcure 3–800 | — | 4.0 | — | — | — | — | — | — | — | — | — |
| Dodecylthiol | — | — | 4.0 | — | — | — | — | — | — | — | — |
| A-189 | — | — | — | 4.0 | — | — | — | — | — | — | — |
| 2-MTI | — | — | — | — | 4.0 | — | — | — | — | — | — |
| 2,3-DM-1,3,4-T | — | — | — | — | — | 4.0 | — | — | — | — | — |
| PETMP | — | — | — | — | — | — | 4.0 | — | — | — | — |
| GDMP | — | — | — | — | — | — | — | 4.0 | — | — | — |
| 2-MBI | — | — | — | — | — | — | — | — | 4.0 | — | — |
| 2-MBT | — | — | — | — | — | — | — | — | — | 4.0 | — |
| Bicat 8 | 1.6 | 1.6 | 1.6 | 1.6 | 1.6 | 1.6 | 1.6 | 1.6 | 1.6 | 1.6 | 1.6 |

Study Two

Figure 2:
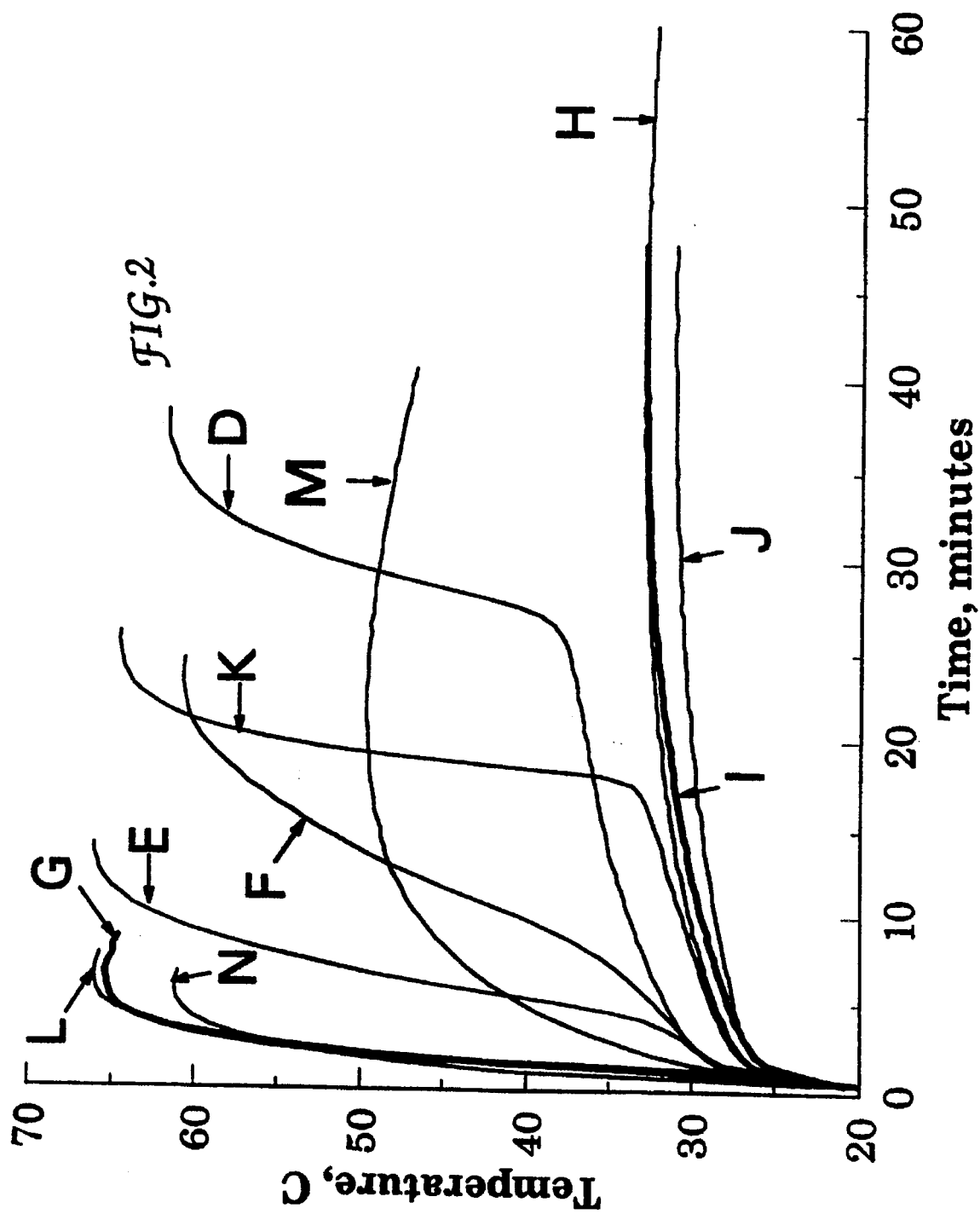
FIG. 2 shows cure profiles for polyol/polyisocyanate systems using different types of mercaptan complexing agents.

Experiments were undertaken to determine how the different mercaptans used in Examples 7–17 as used in conjunction with the Bicat 8 catalyst effected the induction period. In this study, Example 2 as Part A and Examples 7–17 as Part B, respectively, were mixed together in such a way that the isocyanate index was 105. 100 g of the Example 2 formulation was placed in one side of a same type of bag as used in Study One, as described above, heat sealed in the same manner as described for Examples 4–6, and 76 g of one of the Example 7–17 formulations was placed in the other side of the bag and heat sealed. The cure profile was determined using the above mentioned procedure and FIG. 2 graphically shows the results of this study. In FIG. 2, curve "D" represents the results for Example 7; curve "E" represents Example 8; curve "F" represents Example 9; curve "G" represents Example 10; curve "H" represents Example 11; curve "I" represents Example 12; curve "J" represents Example 13; curve "K" represents Example 14; curve "L" represents Example 15; curve "M" represents Example 16; and curve "N" represents Example 17.

Examples 18–23

For purposes of a study of the effect of solvent addition on the induction period, Examples 18–23 were prepared according to the following general procedure. To a 200 liter reaction vessel fitted with nitrogen purge was added 57.7 kg of a polyether triol with an average molecular weight of 2000 obtained under the trade name ARCOL 34-28 from ARCO Chemical Company), 57.8 kg of a polyether diol having an average molecular weight of 6000 obtained under the trade name ARCOL 24-32 from ARCO Chemical Company, 28.6 kg of a polyether diol having an average molecular of 1000 obtained under the trade name Poly G 55-112 from Olin Chemical Co., 10.2 kg of 1,4-butanediol, 8.26 kg of 4,4'-methylene-bis-(2,6-diethylaniline) obtained under the trade name of Lonzacure M-DEA from Lonza Co., 670.0 g of 3-mercapto-1,2-propanediol obtained from Aldrich Chemical, and 290 g of catalyst (Bicat 8 obtained from Shepherd Chemical Company, and described above, were mixed for 1 hr at 50° C. with agitation. This master batch was then divided into separate batches of 900 g or 950 g for Examples 18–23, as indicated in Table 3. Then various solvents as indicated in Table 3 were added in the amounts (in grams) indicated in Table 3 and thoroughly mixed with the formulations of Examples 19–23, but not Example 18. In Table 3, "NMP" means N-methylpyrrolidinone, obtained from Aldrich Chemical; "TOL" means toluene, obtained from Aldrich Chemical; "MECL" means methylene chloride, obtained from Aldrich Chemical; and "MINSP" means mineral spirits.

TABLE 3

| | Examples | | | | | |
|---|---|---|---|---|---|---|
| Reagants | 18 | 19 | 20 | 21 | 22 | 23 |
| Amt. of Master Batch | 900 | 950 | 900 | 900 | 900 | 900 |
| NMP | — | 50 | 100 | — | — | — |
| TOL | — | — | — | 100 | — | — |
| MECL | — | — | — | — | 100 | — |
| MINSP | — | — | — | — | — | 100 |

Study 3

Experiments were undertaken to determine how the addition of solvent to Examples 18–23 as Part B effects the induction period. In this study, Example 2 as Part A and Examples 18–23 as Part B, respectively, were mixed together in such a way that the isocyanate index was 105. 100 g of the Example 2 formulation was placed in one side of a same type of bag as described for Study One above, heat sealed as in Study One, and 76 g of one of the Example 18–23 formulations was placed in the other side of the bag and heat sealed. The cure profile was determined using the above mentioned Test Methods procedure. FIG. 3 graphically shows the results of this study.

In FIG. 3, curve "O" represents Example 18; curve "P" represents Example 19; curve "Q" represents Example 20; curve "R" represents Example 21; curve "S" represents Example 22; and curve "T" represents Example 23.

In FIG. 3, the gelation point for the various polyurethane systems corresponds to that portion of the respective curves, if any, characterized by an overall five-fold increase in the viscosity of the mixture as compared to the initial viscosity of the mixture. In the preferred polyurethane systems of the present invention, in the period of time of 5 to 60 minutes after admixture of the reactants, the systems show at least a five-fold increase in viscosity within a time span of less than 10 minutes indicating an advantageous controlled onset of cure and relatively rapid cure.

While the invention has been described by reference to various specific and preferred embodiments and techniques, it is understood that many variations and modifications can be made thereto without departing from the spirit and scope of the invention.

What is claimed is:

1. A two-part reaction system for producing a polyurethane having an isocyanate index of at least 100 and having a gel time between 5 and 60 minutes after admixture of said two parts, comprising first and second parts located in separate first and second containers, respectively, effective to prevent contact between said first and second parts thereof, (a) said first part comprising a polyisocyanate component;
   (b) said second part comprising
      (i) a polyol component;
      (ii) a polyurethane catalyst comprising a bismuth/zinc polyurethane catalyst; and
      (iii) a molar excess of a complexing agent for said polyurethane catalyst, wherein said complexing agent comprises a mercaptan compound.

2. The two-part reaction system of claim 1, wherein said mercaptan compound is selected from the group consisting of a mercaptoalkylalkoxy silane, a thioglycol, and an alkylthiol.

3. The two-part reaction system of claim 1, wherein said mercaptan compound is selected from the group consisting of mercaptoethanol, $HSCH_2CH_2OH$, thioglycerol, $HSCH_2CH(OH)CH_2OH$, and 3-mercaptopropyltrimethoxysilane.

4. The two-part reaction system of claim 1, wherein a molar ratio of said mercaptan compound to total metal of said polyurethane catalyst ranges from 2:1 to 1,000:1.

5. The two-part reaction system of claim 1, wherein said bismuth/zinc polyurethane catalyst comprises a mixture of a bismuth salt and a zinc salt.

6. The two-part reaction system of claim 5, wherein said bismuth salt comprises bismuth neodecanoate and said zinc salt comprises zinc neodecanoate.

7. The two-part reaction system of claim 6, wherein said bismuth neodecanoate and said zinc neodecanoate are combined in approximately equal amounts by weight, based on the amount of metal in each said salt.

8. The two-part reaction system of claim 1, wherein said polyisocyanate component and said polyol component are present in amounts providing an isocyanate index of from 105 to 150.

9. A catalyzed reaction mixture for producing a polyurethane having an isocyanate index of at least 100, comprising:

(a) a polyisocyanate component;

(b) a polyol component;

(c) a polyurethane catalyst component comprising a bismuth/zinc polyurethane catalyst;

(d) a molar excess of a complexing agent component for said polyurethane catalyst, wherein said complexing agent comprises a mercaptan compound; and wherein upon admixture of said components at a temperature between −5° C. and 40° C., a polyurethane is produced with a gel time between 5 and 60 minutes after said admixture.

10. The catalyzed reaction mixture of claim 9, wherein said mercaptan compound is selected from the group consisting of a mercaptoalkylalkoxy silane, a thioglycol, a alkylthiol.

11. The catalyzed reaction mixture of claim 9, wherein said mercaptan compound is selected from the group consisting of mercaptoethanol, $HSCH_2CH_2OH$, thioglycerol, $HSCH_2CH(OH)CH_2OH$, and 3-mercaptopropyltrimethoxysilane.

12. The catalyzed reaction mixture of claim 9, wherein a molar ratio of said mercapto compound to total metal of said polyurethane catalyst ranges from 2:1 to 1,000:1.

13. The catalyzed reaction mixture of claim 9, wherein said bismuth/zinc polyurethane catalyst comprises a mixture of a bismuth salt and a zinc salt.

14. The catalyzed reaction mixture of claim 9, wherein said bismuth salt comprises bismuth neodecanoate and said zinc salt comprises zinc neodecanoate.

15. The catalyzed reaction mixture of claim 14, wherein said bismuth deneodecanoate and said zinc neodecanoate are combined in approximately equal amounts by weight, based on amount of metal in each said salt.

16. The catalyzed reaction mixture of claim 9, wherein said polyisocyanate component and said polyol component are present in amounts providing an isocyanate index of from 105 to 150.

17. The catalyzed reaction mixture of claim 9, wherein, within 5 to 60 minutes after admixture of said components, said mixture having at least a fivefold increase in viscosity, as measured in centapoise on a Brookfield rheometer at 2 rpm, 50° C. and at approximately 50% relative humidity, within a time span of less than 10 minutes.

18. A method for forming a cured polyurethane having an isocyanate index of at least 100 or greater, comprising: admixing, in the presence of water moisture or vapor and at a temperature between −5° C. and 40° C., (i) a polyisocyanate component, (ii) a polyol component, (iii) a polyurethane catalyst component comprising a bismuth/zinc polyurethane catalyst, and (iv) a molar excess of a complexing agent component for said polyurethane catalyst, wherein said complexing agent comprises a mercaptan compound;

wherein said cured polyurethane being produced with a gel time between 5 and 60 minutes after said admixing.

19. A method of forming a polyurethane sealant and/or adhesive on a surface comprising the steps of:

(a) providing a two-part reaction system mixture for producing a polyurethane comprising, providing:

(1) a first part comprising polyisocyanate component, and (2) a second part comprising (i) a polyol component, (ii) a polyurethane catalyst comprising a bismuth/zinc polyurethane catalyst, and (iii) a molar excess of a complexing agent for said polyurethane catalyst, wherein said complexing agent comprises a mercaptan compound, wherein said first and second parts are situated in separate first and second containers, respectively, effective to temporarily prevent contact between said first and second parts;

(b) mixing said first and second parts at a temperature between −5° C. and 40° C.;

(c) applying said catalyzed reaction mixture to a surface at an ambient temperature of between −5° C. to 40° C. before said mixture reaches a gel time, wherein said gel time occurs between 5 and 60 minutes after step (b);

(d) allowing said catalyzed reaction mixture to reach said gel time at an ambient temperature of −5° C. to 40° C. to form a crosslinked polyurethane having an isocyanate index of at least 100 and being attached to said surface.

20. The method of claim 19, wherein said surface comprises a material selected from the group consisting of glass, metal, wood, plastic, nonwoven fabric, woven fabric, leather, and ceramic.

21. The method of claim 19, wherein said surface is glass.

22. The method of claim 19, wherein said surface is metal.

23. A method of attaching and sealing a curved glass sheet to a holding means comprising the steps of:

(a) providing (i) a curved glass sheet having opposing major surfaces defining a continuous external peripheral side portion therebetween, and (ii) a rigid apertured holding means completely enclosing an opening, wherein said holding means includes a continuous interior peripheral portion defining an aperture and including a recessed profile adapted to receivably engage and hold said continuous external peripheral side portion of said curved glass sheet;

(b) providing a two-part reaction system mixture for producing a polyurethane comprising, providing:

(1) a first part comprising polyisocyanate component, and (2) a second part comprising (i) a polyol component, (ii) a polyurethane catalyst comprising a bismuth/zinc polyurethane catalyst, and (iii) a molar excess of a complexing agent for said polyurethane catalyst, wherein said complexing agent comprises a mercaptan compound, wherein said first and second parts are situated in separate first and second containers, respectively, effective to temporarily prevent contact between contents thereof;

(c) mixing said contents of said first and second parts at a temperature between −5° C. and 40° C.;

(d) applying said catalyzed reaction mixture to one of said recessed portion of said continuous interior peripheral portion or said continuous external peripheral side portion of said curved glass sheet, at an ambient temperature of between −5° C. to 40° C. before said mixture reaches a gel time, wherein said gel time occurs between 5 and 60 minutes after step (c);

(e) positioning said curved glass sheet wherein said continuous external peripheral side portion of said curved glass sheet is receivably engaged in said recessed portion of said continuous interior peripheral portion of said holding means;

(f) allowing said catalyzed reaction mixture to reach said gel time at an ambient temperature of −5° C. to 40° C. to form a crosslinked polyurethane having an isocyanate index of at least 100 and effective to attach and seal said curved glass sheet to said holding means.

24. The method of claim 23, wherein said applying of said catalyzed reaction mixture in step (d) is performed on said continuous interior peripheral portion of said holding means.

25. The method of claim 23, wherein said holding means comprises a metal material.

26. The method of claim 23, wherein said curved glass sheet comprises a three-dimensional shape, said shape being concavo-convex.

27. The method of claim 23, wherein said curved glass sheet comprises a transparent laminate including a polyvinylbutyral film having opposite major surfaces, and first and second glass layers, said first and second glass layers adhered to said opposite major surfaces, respectively.

28. The product of the method of claim 18.

* * * * *